US012645457B2

(12) United States Patent (10) Patent No.: US 12,645,457 B2
Anderson et al. (45) Date of Patent: *Jun. 2, 2026

(54) SYSTEM AND METHOD FOR ADDRESSING DATA IN MEMORY

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Joseph Zbiciak, San Jose, CA (US); Kai Chirca, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,034

(22) Filed: Dec. 5, 2023

(65) Prior Publication Data

US 2024/0103863 A1 Mar. 28, 2024

Related U.S. Application Data

(63) Continuation of application No. 17/387,450, filed on Jul. 28, 2021, now Pat. No. 11,836,494, which is a (Continued)

(51) Int. Cl.
G06F 9/22 (2006.01)
G06F 9/30 (2018.01)

(52) U.S. Cl.
CPC ...... G06F 9/30123 (2013.01); G06F 9/30101 (2013.01); G06F 9/30134 (2013.01)

(58) Field of Classification Search
CPC ............. G06F 9/30123; G06F 9/30101; G06F 9/30134
See application file for complete search history.

(56) References Cited

U.S. PATENT DOCUMENTS 3,560,935 A 2/1971 Beers
4,240,139 A 12/1980 Fukuda et al.
(Continued)

FOREIGN PATENT DOCUMENTS

CN 1146249 C 4/2004
CN 1306640 C 3/2007

OTHER PUBLICATIONS

Office Action for Chinese Application No. 2020104344988 dated Dec. 13, 2024.

(Continued)

*Primary Examiner* — Cheng Yuan Tseng
(74) *Attorney, Agent, or Firm* — Michael T. Gabrik; Frank D. Cimino

(57) ABSTRACT

A digital signal processor having a CPU with a program counter register and, optionally, an event context stack pointer register for saving and restoring the event handler context when higher priority event preempts a lower priority event handler. The CPU is configured to use a minimized set of addressing modes that includes using the event context stack pointer register and program counter register to compute an address for storing data in memory. The CPU may also eliminate post-decrement, pre-increment and post-decrement addressing and rely only on post-increment addressing.

18 Claims, 2 Drawing Sheets

| BIT 63 - BIT 49 | BIT 48 - BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|---|
| RESERVED | BASE (ECSP BASE ADDRESS, UPPER 33 BITS OF 49-BIT ADDR) | (NCNT) NEST COUNT | | | RESERVED, NOT IMPLEMENTED | | | | | | | | | | | | |

21  22

Related U.S. Application Data continuation of application No. 16/421,920, filed on May 24, 2019, now Pat. No. 11,106,463.

(56)                    References Cited

U.S. PATENT DOCUMENTS

| | | | | |
|---|---|---|---|---|
| 4,471,433 | A * | 9/1984 | Matsumoto | G06F 9/3804 |
| | | | | 712/E9.056 |
| 4,761,734 | A * | 8/1988 | van Meerbergen | |
| | | | | G06F 9/30072 |
| | | | | 712/E9.05 |
| 5,041,969 | A * | 8/1991 | Kawasaki | G06F 9/3877 |
| | | | | 712/E9.07 |
| 5,642,489 | A | 6/1997 | Bland et al. | |
| 5,944,841 | A | 8/1999 | Christie | |
| 5,954,811 | A | 9/1999 | Garde | |
| 6,038,661 | A | 3/2000 | Yoshioka et al. | |
| 6,157,967 | A | 12/2000 | Horst et al. | |
| 6,697,916 | B2 | 2/2004 | Lasserre et al. | |
| 6,807,595 | B2 | 10/2004 | Khan et al. | |
| 6,976,158 | B2 | 12/2005 | Catherwood et al. | |
| 7,472,214 | B2 * | 12/2008 | Nankaku | G06F 9/4812 |
| | | | | 710/240 |
| 7,533,236 | B1 | 5/2009 | Nordquist | |
| 7,533,237 | B1 | 5/2009 | Nordquist | |
| 8,516,502 | B2 * | 8/2013 | Chauvel | G06F 9/4812 |
| | | | | 718/1 |
| 8,533,433 | B2 * | 9/2013 | Strom | G06F 9/30174 |
| | | | | 712/209 |
| 9,256,369 | B2 | 2/2016 | Nazm Bojnordi et al. | |
| 9,606,803 | B2 | 3/2017 | Anderson et al. | |
| 9,652,241 | B2 | 5/2017 | Morfey et al. | |
| 10,489,188 | B2 | 11/2019 | Udava et al. | |
| 10,540,287 | B2 | 1/2020 | Brekelbaum et al. | |
| 10,908,909 | B2 | 2/2021 | Moudgill et al. | |
| 11,106,463 | B2 * | 8/2021 | Anderson | G06F 9/30123 |
| 11,836,494 | B2 * | 12/2023 | Anderson | G06F 9/3557 |
| 2006/0026390 | A1 | 2/2006 | Cabillic et al. | |
| 2007/0277021 | A1 | 11/2007 | O'Connor et al. | |
| 2008/0256335 | A1 * | 10/2008 | Matsuoka | G06F 9/30167 |
| | | | | 712/205 |

OTHER PUBLICATIONS

Wei, et al.; "High Performance Digit Signal Processor Design" Aug. 30, 2004; 6 pages.

* cited by examiner

| BIT 63 - BIT 49 | BIT 48 - BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|---|
| RESERVED | BASE (ECSP BASE ADDRESS, UPPER 33 BITS OF 49-BIT ADDR) | (NCNT) NEST COUNT | | | | RESERVED, NOT IMPLEMENTED | | | | | | | | | | | |
| | 21 | 22 | | | | | | | | | | | | | | | |

SYSTEM AND METHOD FOR ADDRESSING DATA IN MEMORY

CROSS-REFERENCE TO RELATED APPLICATIONS

This application is a continuation of U.S. patent application Ser. No. 17/387,450, filed Jul. 28, 2021, which is a continuation of U.S. patent application Ser. No. 16/421,920, filed May 24, 2019, now U.S. Pat. No. 11,106,463, each of which is incorporated herein by reference in its entirety.

BACKGROUND

Modern digital signal processors (DSP) faces multiple challenges. Workloads continue to increase, requiring increasing bandwidth. Systems on a chip (SOC) continue to grow in size and complexity. Memory system latency severely impacts certain classes of algorithms. Moreover, modes for addressing data in memory may be complex and/or may not address the needs of many DSPs.

SUMMARY

Examples described herein include a method for addressing data in a memory. The method comprises using an event context stack pointer as a base address. Other examples described herein include a digital signal processor. The digital signal process comprises a CPU. The CPU comprises a program counter register, which the CPU is configured to use as a base address for storing data in memory. The CPU may in addition be configured to address memory using post-increment addressing, and not configured to address memory using pre-increment, pre-decrement or post decrement addressing. The CPU may also comprise an event context stack pointer register for saving and restoring event handler context when higher priority event preempts a lower priority event handler. The CPU may alternatively use the event context stack pointer register as a base address for storing data in memory.

Other examples described herein include a digital signal processor system. The digital signal processor system comprises a memory and a digital signal processor. The digital signal processor comprises a CPU. The CPU comprises a program counter register, which the CPU is configured to use as a base address for storing data in memory. The CPU may in addition be configured to address memory using post-increment addressing, and not configured to address memory using pre-increment, pre-decrement or post decrement addressing. The CPU may also comprise an event context stack pointer register for saving and restoring event handler context when higher priority event preempts a lower priority event handler. The CPU may alternatively use the event context stack pointer register as a base address for storing data in memory.

BRIEF DESCRIPTION OF THE DRAWINGS

For a detailed description of various examples, reference will now be made to the accompanying drawings in which.

DETAILED DESCRIPTION

Figure 1:
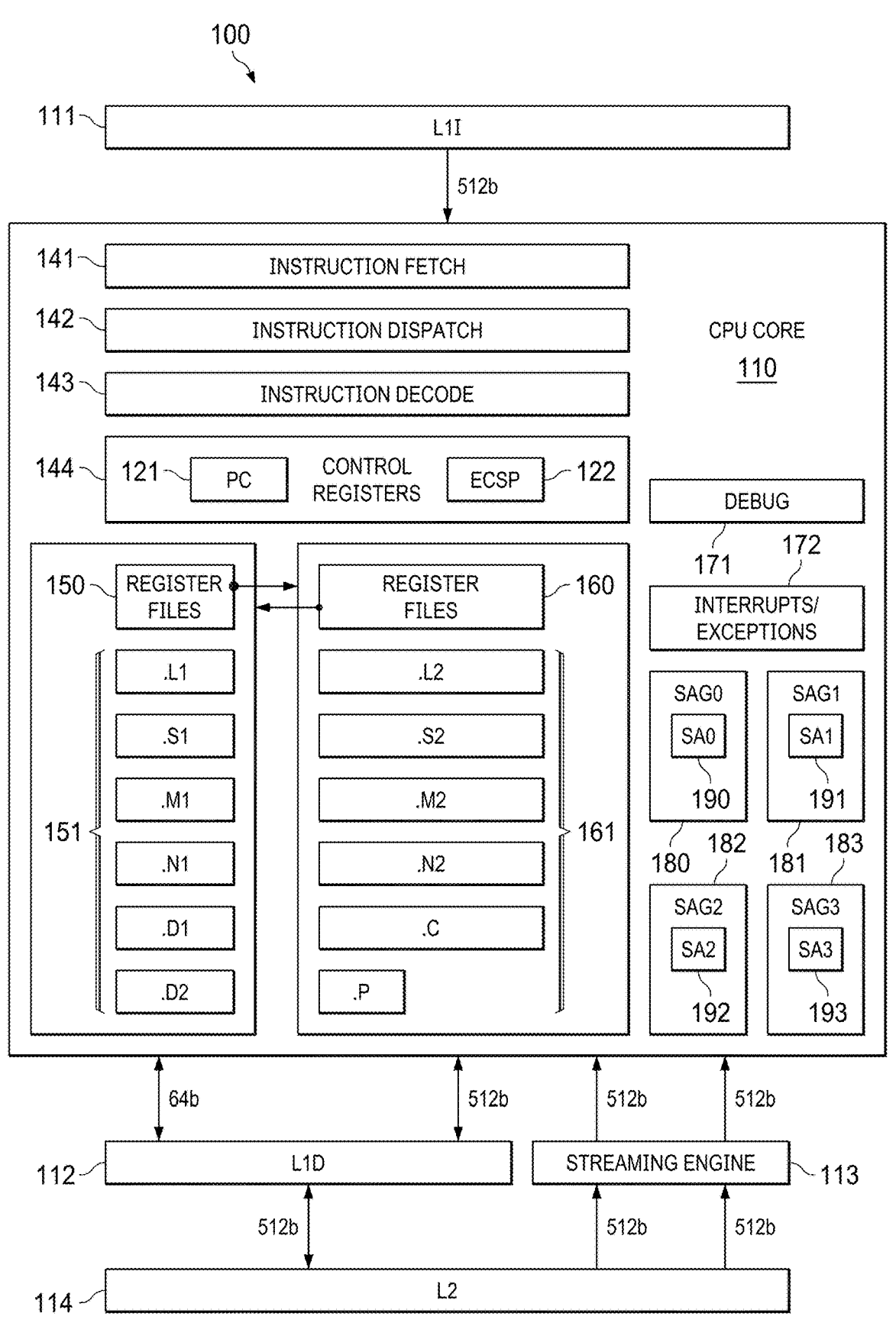
FIG. 1 illustrates a DSP according to embodiments described herein.

FIG. 1 illustrates a block diagram of DSP 100, which includes vector CPU core 110. As shown in FIG. 1, vector CPU 110 includes instruction fetch unit 141, instruction dispatch unit 142, instruction decode unit 143, and control registers 144. Vector CPU 110 further includes 64-bit register files 150 (for example, designated registers A0 to A15 and D0 to D15) and 64-bit functional units 151 for receiving and processing 64-bit scalar data from level one data cache (L1D) 112. Vector CPU 110 also includes 512-bit register files 160 and 512-bit functional units 161 for receiving and processing 512-bit vector data from level one data cache (L1D) 112 and/or from streaming engine 113. Vector CPU 110 may also include debug unit 171 and interrupt logic unit 172.

DSP 100 also includes streaming engine 113. As described in U.S. Pat. No. 9,606,803 (hereinafter "the '803 patent"), incorporated by reference herein in its entirety, a streaming engine such as streaming engine 113 may increase the available bandwidth to the CPU, reduces the number of cache misses, reduces scalar operations and allows for multi-dimensional memory access. DSP 100 also includes, in the vector CPU 110, streaming address generators 180, 181, 182, 183. As described in more detail in a U.S. Patent Application entitled, "Streaming Address Generation" (hereinafter "the Streaming Address Generation application"), filed concurrently herewith, and incorporated by reference herein, the streaming address generator 180 generates offsets for addressing streaming data. While FIG. 1 shows four streaming address generators, as described in the concurrently filed application, there may one, two, three or four streaming address generators and, in other examples, more than four. As described in the Streaming Address Generation application, offsets generated by streaming address generators 180, 181, 182, 183 are stored in streaming address offset registers SA0 190, SA1 191, SA2 192 and SA3 193, respectively.

Figure 2:
FIG. 2 illustrates an exemplary event context stack pointer register.

The control registers 144 include a program counter (PC) register 121 and, optionally, one or more event context stack pointers (ECSP) 122. The ECSP register 122 is used by the DSP to save and restore event handler context when a higher priority event preempts a lower priority event handler. The ECSP register 122 preserves context in the event of interrupts and contain the address used to stack machine status when an event is detected. FIG. 2 illustrates an exemplary ECSP register, which includes an address 21 and a nested interrupt counter 22.

To write data from the CPU, a store operation is typically used. To read data into the CPU, a load operation is typically used. To indicate the address in memory for reading or writing data, a base address is typically provided as an operand, and optionally an offset.

The base address register can be any of A0-A15 (preferably A0-A15), D0-D15 64-bit scalar registers. Such registers are collectively referred to hereinafter as "baseR." The program counter (PC) or event context stack pointer (ECSP) control registers can also be used as the base address register.

The base address register may also be a 64-bit register. In this case, because the virtual address size is typically 49-bits, the remaining upper bits (e.g., 15 bits) of this register are not used by the address generation logic or uTLB lookup. However, those bits are checked to make sure they are all 0's or all 1's, if not, an address exception may be generated.

A constant offset can be a scaled 5-bit unsigned constant or a non-scaled signed 32-bit constant. This value may be scaled by the data type, e.g., element size (shift by 0, 1, 2, or 3 if the element size is Byte, Half-Word, Word or Double-Word respectively) and the result (up to 35-bits result after the shift) may be sign-extended the rest of the way to 49 bits. This offset may then added to the base address register. The offset value may default to 0 when no bracketed register or constant is specified.

Load and store instructions may use for the offset, for example, the A0-A15 (preferably A8-A15), D0-D15 registers. ADDA/SUBA instructions, which perform linear scaled address calculation by adding a base address operand with a shifted offset value operand, can use, for example, the A0-A15, D0-D15 registers. Collectively, the valid register offset is denoted as offset R32. The streaming address offset registers SA0 190, SA1 191, SA2 192 and SA3 193 may also be used for the offset for load, store, ADDA or SUBA instructions. Streaming address offset registers SA0 190, SA1 191, SA2 192 and SA3 193 can be used with or without advancement. Exemplary syntax used for advancement of streaming address offset register SA0 is "SA0++", which will advance the offset after it is used to the next offset, as described in the Streaming Address Generation application.

Postincrement addressing updates the base register by a specified amount after address calculation. For postincrement addressing, the value of the base register before the addition is the address to be accessed from memory. Post increment operation of the base address register is denoted as baseR++. Such an operation will increment the base register by one addressed element size after the value is accessed.

Using the program counter 121 as the base address may be referred to as PC-relative addressing mode. PC-relative references may be relative to the PC of the fetch packet containing the reference. This may be true for an execute packet spanning fetch packet as well, where the PC reference may be relative to the fetch packet which contains the instruction that has the PC-relative addressing mode. Specifically, the address that is used for the base address when using the PC relative addressing mode is, in at least one example, the address of the fetch packet containing the .D unit instruction that has the PC relative addressing mode.

For example, for this code sequence:

LDW .D1*PC[0x30], A0

||LDW .D2*PC[0x34], A1

If the instruction on .D1 and the instruction on .D2 are in different fetch packets due to spanning, then they will end up using different values for the PC.

Using an ECSP 122, shown in FIG. 2, as the base address provides the benefit that the address will be preserved in the event of interrupts, or even nested interrupts.

Table 1 shows addressing modes for load and store operations according to examples described above:

| Addressing type | No modification of base address register | Post-increment |
|---|---|---|
| Register indirect, no offset | baseR[0] | baseR++[0] base register incremented by element size |
| Register indirect, offset by access size in bytes | baseR | baseR++ base register incremented by element size |
| Register relative with 5-bit unsigned constant offset, scaled | baseR[ucst5] | baseR++[ucst5] base register incremented by ucst5 constant |
| Register relative with 32-bit signed constant offset, unscaled | baseR(scst32) | baseR++(scst32) base register incremented by scst32 constant |

4

-continued

| Addressing type | No modification of base address register | Post-increment |
|---|---|---|
| Register relative with 32-bit register index, scaled | baseR [offsetR32] | baseR++ [offsetR32] base register incremented by offset |
| Register relative with Streaming Address Generator as register index, scaled | baseR[SA] | baseR[SA++] advances SA by one iteration, base register unchanged |
| Program Counter Register relative with 5-bit unsigned constant offset, scaled | PC[ucst5] | Not Supported |
| Program Counter Register relative with 32-bit signed constant offset, unscaled | PC(scst32) | Not Supported |
| Event Context Stack Pointer Register relative with 5-bit unsigned constant offset, scaled | ECSP[ucst5] | Not Supported |
| Event Context Stack Pointer Register relative with 32-bit signed constant offset, unscaled | ECSP(scst32) | Not Supported |

By limiting the addressing modes to only a few options and by including only post-increment (i.e., no pre-increment or pre-/post-decrement), design verification spaces are reduced, and fewer opcode bits are needed.

Modifications are possible in the described embodiments, and other embodiments are possible, within the scope of the claims.

What is claimed is:

1. A device comprising:
a set of control registers that includes a program counter register and a stack pointer register, wherein the stack pointer register includes a first field configured to store a first portion of a base address and a second field configured to store a nested count; and
a set of functional units coupled to the set of control registers and configured to:
in a first mode, load a first set of data from a first address specified by the program counter register; and
in a second mode, load a second set of data from a second address specified by the stack pointer register.

2. The device of claim 1 further comprising a memory coupled to the set of functional units, wherein the set of functional units is configured to load the first set of data and the second set of data from the memory.

3. The device of claim 2, wherein the memory is a level one data (L1D) cache.

4. The device of claim 1 further comprising an interrupt circuit coupled to the set of control registers and configured to detect an event, and based on the event, store a value in the stack pointer register.

5. The device of claim 1, wherein the stack pointer register does not specify a second portion of the base address.

6. The device of claim 1, wherein:
the set of functional units is configured to:
load the first set of data in response to a first instruction that specifies a first offset; and
load the second set of data in response to a second instruction that specifies a second offset;

the first address is further based on the first offset; and
the second address is further based on the second offset.

7. The device of claim 1 further comprising interrupt circuitry configured to detect an event, wherein the set of functional units is configured to select between the first mode and the second mode based on the event.

8. The device of claim 7, wherein the event is associated with preemption of an event handler.

9. The device of claim 1, wherein the set of functional units is configured to:

increment a value stored in the program counter register after the load of the first set of data.

10. A device comprising:

a set of control registers that includes a program counter register and a stack pointer register, wherein the stack pointer register includes a first field configured to store a first portion of a base address and a second field configured to store a nested count; and a set of functional units coupled to the set of control registers and configured to:

in a first mode, store a first set of data to a first address specified by the program counter register; and in a second mode, store a second set of data to a second address specified by the stack pointer register.

11. The device of claim 10 further comprising a memory coupled to the set of functional units, wherein the set of functional units is configured to store the first set of data and the second set of data to the memory.

12. The device of claim 11, wherein the memory is a level one data (L1D) cache.

13. The device of claim 10 further comprising an interrupt circuit coupled to the set of control registers and configured to detect an event, and based on the event, store a value in the stack pointer register.

14. The device of claim 10, wherein the stack pointer register does not specify a second portion of the base address.

15. The device of claim 10, wherein:

the set of functional units is configured to:

store the first set of data in response to a first instruction that specifies a first offset; and store the second set of data in response to a second instruction that specifies a second offset;

the first address is further based on the first offset; and the second address is further based on the second offset.

16. The device of claim 10 further comprising interrupt circuitry configured to detect an event, wherein the set of functional units is configured to select between the first mode and the second mode based on the event.

17. A method comprising:

receiving an instruction;

determining whether to generate an address associated with the instruction based on a first value stored in a program counter register or on a second value stored in a stack pointer register, wherein the stack pointer register includes a first field configured to store a first portion of a base address and a second field configured to store a nested count;

generating the address based on a result of the determining step; and performing the instruction using the address.

18. The method of claim 17, wherein the performing of the instruction includes performing at least one of a read of a set of data from a memory using the address or a write of a set of data to the memory using the address.

* * * * *